March 31, 1959   C. R. COFFEY   2,880,044
PISTON WITH TOP PROTECTED
Filed June 5, 1957
FIG_1
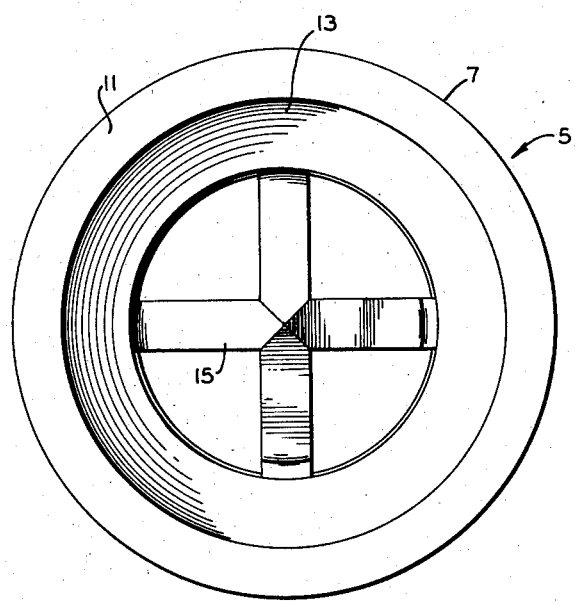
FIG_3
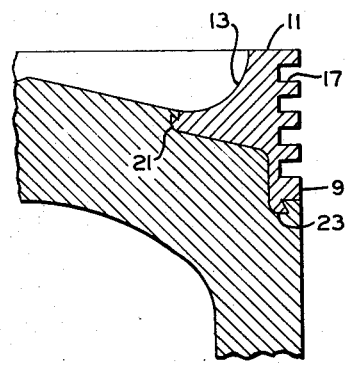
FIG_2
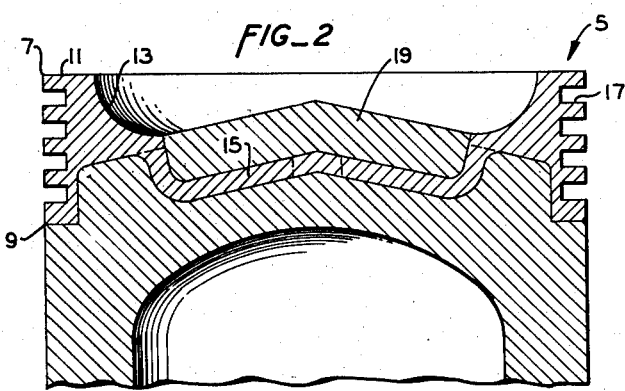
FIG_4
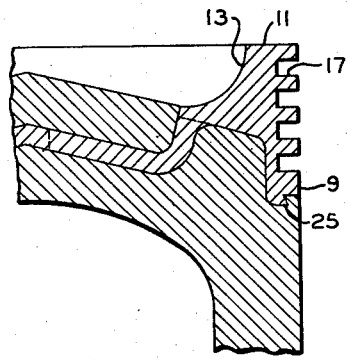
INVENTOR.
CHARLES R. COFFEY
ECKHOFF & SLICK
ATTORNEYS
BY
A MEMBER OF THE FIRM

United States Patent Office 2,880,044
Patented Mar. 31, 1959

2,880,044

PISTON WITH TOP PROTECTED

Charles R. Coffey, San Leandro, Calif., assignor to United Engine & Machine Co., a corporation of California Application June 5, 1957, Serial No. 663,655

5 Claims. (Cl. 309—14)

This invention relates to a piston for an internal combustion engine and more particularly relates to a piston for an engine which is made of a light metal and which has a cap thereon which serves to protect the top of the piston from erosion. In one embodiment of the piston, the cap serves to hold one or more rings of the piston and thus prevent excessive wear of the ring grooves.

In modern, high output engines, it is highly desirable to provide a piston of a lightweight metal such as an aluminum alloy, but such pistons in the past have suffered from the disadvantage that the head softens at engine operating temperatures, making the piston subject to erosion, and it is this erosion which limits the life of the piston. In diesel engines the injector injects the oil onto the top of the piston, producing a localized hot spot, which is much higher in temperature than the general operating temperature of the engine, and the combination of the high temperature which softens the piston, together with high gas velocities produced upon ignition of the fuel, result in erosion of the top of the piston. In spark ignition engines with high compression ratios, detonation waves cause a scouring action on the softened head resulting in erosion. Further, lightweight metals are relatively soft and pistons of lightweight metal do not hold up under heavy duty service for the reason that the heat softened metal wears rapidly at the ring grooves.

Although there have been various suggestions for providing pistons with inserts for holding the rings and also for protecting the top of the piston, such designs have not been thoroughly satisfactory.

It is an object of the present invention to provide a cap or top for a light metal piston of a high heat resistant material to protect the head from erosion. One embodiment of the invention includes a ring groove structure which also prevents excessive wear at the ring grooves.

In general, the objects of the present invention are achieved by providing a cap for the piston, which is cast into place on the piston and thus becomes an integral part thereof, said cap being made of a ferrous alloy having greater wear resistance than the aluminum alloys from which pistons are commonly made.

In the drawings forming a part of this application:

Figure 1 is a plan view of a member suitable for use as a piston insert.

Figure 2 is a cross sectional view of a piston embodying the insert of Figure 1.

Figure 3 is a fragmentary view, similar to Figure 2, showing a piston in cross section wherein the insert has locking projections thereon for holding it firmly in the body of the piston.

Figure 4 is a sectional view, similar to Figure 3, of an insert which is held partially by means of a projection, but which generally embodies the features shown in Figure 2 of the drawing.

Referring now to the drawings by reference characters, there is shown an insert, generally designated 5, of a ferrous metal such as a nickel-iron alloy. The insert has an annular rim 7, which terminates in a down-turned edge 9. The top of the insert has a flat annular area 11 and is then dished into a concave configuration, as at 13. In the embodiment shown in Figures 1, 2 and 4, a series of radially extending elements or spokes 15 are provided, which help anchor the insert in place. The spokes 15 may be suitably four in number, although a smaller or larger number may be used. The spokes may terminate short of the center so they are not joined to each other, or they may be eliminated altogether, as is shown in Figure 3. In the pistons shown in Figures 2, 3 and 4, a series of ring grooves 17 are shown in the insert. However, the ring grooves would ordinarily be turned in the insert after the piston is cast, and the insert would ordinarily not contain the grooves shown prior to casting.

In all of the embodiments shown, the insert serves both to protect the top of the piston and to carry the rings. However, it is not necessary that the insert carry the rings, the essential embodiment of the invention being the protection of the top of the piston from erosion.

Various anchoring means may be used to hold the insert in place. One of the preferred methods of doing this is to bond molecularly the ferrous insert to the aluminum at the time the piston is cast. This method of molecular bonding is well-known to those skilled in the art and will not be herein described. Another method is to hold the insert in place by purely mechanical means. Thus, referring to Figure 2, it will be seen that in casting, the body metal of the piston has flowed up and over the spokes 15, as at 19, so that the insert is held firmly in place by the fact that the light metal of the piston has flowed around it. Similarly, in the embodiment shown in Figure 3, the insert is provided with a pair of projections 21 and 23, and the light metal of the piston flows around the projections, anchoring the insert firmly in place. In the embodiment shown in Figure 4, a single projection 25 has been used at the bottom of the insert to anchor it into place.

In addition, a combination of the mechanical method and the molecular bonding method may be used. Thus, any of the designs illustrated may be both molecularly bonded and locked in place by means of the metal flowing around certain portions of the insert.

In making pistons in accordance with the present invention, it is preferable that the insert have the same, or nearly the same, coefficient of expansion as the body of the piston. Thus, when utilizing a high silicon aluminum-base alloy such as is known commercially as A–132 or D–132 for the body of the piston, the insert may be made from a high nickel cast iron such as is known as type 1A Ni-resist.

It is believed obvious from the foregoing that I have provided a piston which is made of a relatively light material, yet which has its head protected by means of a cap of a ferrous alloy so that the piston embodies both the lightness of aluminum and the strength of iron.

I claim:

1. In a piston for an internal combustion engine having a body of a light aluminum alloy and having a generally dished top, the improvement comprising an annular collar of a ferrous material fixed to the top thereof, said collar extending from the top peripheral edge of the piston and terminating a short distance inside the periphery, whereby a circular, concentric area of the light aluminum alloy is exposed on the top of the piston.

2. The structure of claim 1 wherein said collar is in the form of a raised ring bearing a series of spoke-like members which extend under the body metal of the piston in the center thereof, said spoke-like members aiding in securing said collar in place on said piston.

3. The structure of claim 1 wherein said collar is in the form of a raised ring bearing a series of spoke-like members which extend under the body metal of said piston and meet one another in the center of said piston beneath said body metal in the center thereof.

4. The structure of claim 1 wherein said collar has at least a single ring groove therein.

5. The structure of claim 1 wherein said collar and the body of said piston have substantially the same coefficient of expansion.

References Cited in the file of this patent

UNITED STATES PATENTS

| | | |
|---|---|---|
| 1,946,081 | Koch | Feb. 6, 1934 |
| 2,124,360 | Welty | July 19, 1938 |
| 2,731,313 | Walker et al. | Jan. 17, 1956 |
| 2,782,082 | Harrah | Feb. 19, 1957 |

FOREIGN PATENTS

| | | |
|---|---|---|
| 659,127 | Great Britain | Oct. 17, 1951 |
| 830,587 | Germany | Feb. 7, 1952 |

OTHER REFERENCES

Diesel Power, vol. 34, Issue 1, p. 76, January 1956.

SAE Journal, vol. 61, Issue 10, pp. 34–35, October 1953.